United States Patent

Bobeck et al.

[15] 3,702,995

[45] Nov. 14, 1972

[54] SINGLE WALL DOMAIN ARRANGEMENT

[72] Inventors: Andrew Henry Bobeck, Chatham; Frank John Ciak, Roselle Park; Walter Strauss, Summit, all of N.J.

[73] Assignee: Bell Telephone Laboratories, Incorporated, Murray Hill, N.J.

[22] Filed: Nov. 24, 1971

[21] Appl. No.: 201,755

[52] U.S. Cl. ........................340/174 EB, 340/174 TF
[51] Int. Cl. ..............................................G11c 11/14
[58] Field of Search ...................340/174 TF, 174 EB

[56] References Cited

UNITED STATES PATENTS

| | | | |
|---|---|---|---|
| 3,530,446 | 9/1970 | Perneski | 340/174 TF |
| 3,541,534 | 11/1970 | Bobeck et al. | 340/174 TF |
| 3,609,720 | 9/1971 | Strauss | 340/174 TF |

OTHER PUBLICATIONS

IBM Technical Disclosure Bulletin " Angelfish Logical Connectives for Bubble Domains" by Alanasi et al., Vol. 13, No. 10, 3/71, p. 2,992- 2,993

IBM Technical Disclosure Bulletin " Magnetic Bubble Sensing" by Bailot et al. Vol. 13, No. 10; 3/71, p. 3,100, 3,101

*Primary Examiner*—Stanley M. Urynowicz, Jr.
*Attorney*—R. J. Guenther et al.

[57] ABSTRACT

A single wall domain arrangement comprises channels which are defined in a layer of magnetic material by patterns of magnetically soft elements along which domains move responsive to a magnetic field reorienting in the plane of the layer. The elements are formed by a single photoresist process resulting in the simultaneous formation of a compatible magnetoresistance detector.

13 Claims, 3 Drawing Figures

SINGLE WALL DOMAIN ARRANGEMENT

FIELD OF THE INVENTION

This invention relates to single wall domain memory arrangements.

BACKGROUND OF THE INVENTION

Single wall domains and the movement of domains of this type in a layer of magnetic material along channels defined by a pattern of magnetically soft elements coupled to the layer is disclosed in U.S. Pat. No. 3,534,347 of A. H. Bobeck issued Oct. 13, 1970. The movement of domains is in response to a uniform magnetic field reorienting, typically by rotation, in the plane of the layer in what has been termed a "field access" mode of operation.

A magnetoresistance detector for magnetic domains is disclosed in U.S. Pat. No. 3,609,720, of W. Strauss issued Sept. 28, 1971. That detector is shown to be compatible with the above-mentioned rotating field and actually may employ a channel-defining element as the magnetoresistance element of the detector. But in practice a magnetoresistance element is made thinner than the channel-defining elements in order to reduce both the current applied to the magnetoresistance element and the disturbing effects of the fields and poles generated thereby. Optimum thicknesses for magnetoresistance elements are about 300 Angstrom units. The propagation elements on the other hand are preferable considerably thicker, for example, 3,000 Angstrom units. It would, of course, be a considerable processing advantage to form a magnetoresistance detector element and the channel-defining elements of the same thickness and in a single photoresist process.

On the other hand, it is not clear what magnetoresistance element geometry would permit such a process to be used. It does appear clear that changes in the cross section of the element accomplish little in the way of improved output signal and changes in shape endanger propagation margins. A magnetoresistance detector element comprises typically a 300 Angstrom unit thick layer of permalloy. This material is characterized by a 3 percent magnetoresistance coefficient and a sheet resistance of 10 ohms per square. A "square" of a 300 Angstrom thick permalloy layer ideally gives an output signal of 300 microvolts per milliampere. Ion migration appears to limit the allowable current density in any such magnetoresistance element. Consequently, there appears to be an upper limit to the current density in such an element. Yet the output signal level provided by a magnetoresistance detector increases proportionally with increasing current density. If the absolute signal level is taken as the single most important detector criterion, an increase in the element cross section is to be accompanied by an increased current in order to avoid lowering the detector current density and thus lowering the signal level. The problem then is to obtain an increased output signal for a specified current density.

An increase in the length of the magnetoresistance element of, for example, a factor of three from about the size of a 6 micron domain to three times that size provides an increased output signal of from 100 to about 300 microvolts/milliampere. Moreover, the realization that the output signal is independent of Permalloy thickness suggests that the magnetoresistance element (viz: an elongated element) can be incorporated into the Permalloy propagation pattern and formed therewith in a single photoresist process. But the propagation pattern must not be adversely effected in its performance by the inclusion of the magnetoresistance element.

Copending application, Ser. No. 160,841 filed July 8, 1971 for A. H. Bobeck and H. E. D. Scovil describes channel-defining elements for field access, single wall domain arrangements as being fine-grained and permitting displacement of domains laterally from channel-to-channel. The pattern formed by the elements is that of a chevron with elements laterally displaced from one another a distance of about the diameter of a domain in the adjacent layer.

This type of pattern has the advantage that domains of differing geometry are propagated along the channel simultaneously in response to the in-plane field and is particularly compatible with elongated magnetoresistance elements.

BRIEF DESCRIPTION OF THE INVENTION

It has been found that the number of laterally displaced elements in consecutive stages of a channel defined by such a fine-grained pattern can be successively increased from a minimum number at an input stage to a maximum number at a detection stage and then decreased successively to the minimum number in, for example, a recirculating field access memory giving rise to a corresponding growth and subsequent reduction in size of the lateral dimension of a domain as the domain is moved past the detection stage. If the elements of the detection stage are joined by a common magnetically soft element having a thickness equal to that of the channel-defining elements and a width to saturate magnetically when aligned with the in-plane field, the common element defines an elongated magnetoresistance detector which may be formed with the remaining elements in a single photo resist process.

DETAILED DESCRIPTION

Figure 1:
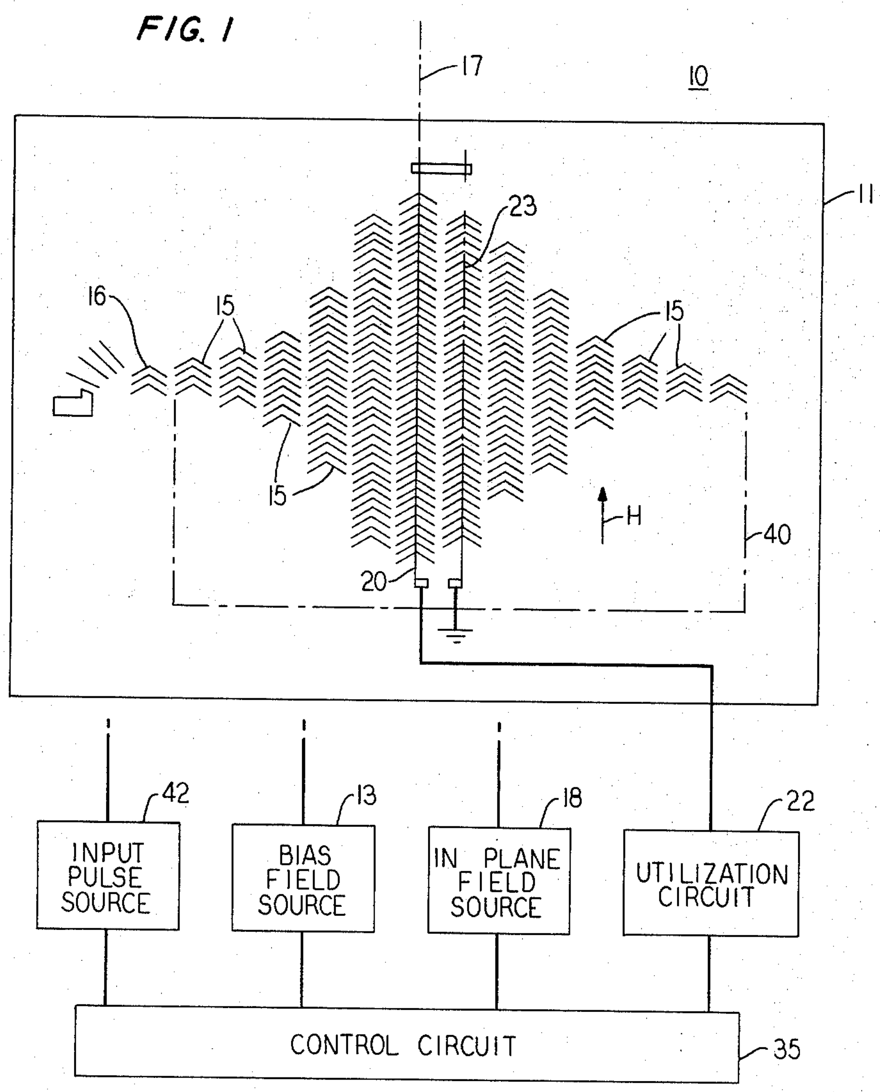
FIG. 1 is a schematic representation of a fine-grained, field access, single wall domain arrangement in accordance with this invention; and, FIGS. 2 and 3 are schematic representations of portions of the arrangement of FIG. 1.

FIG. 1 shows a single wall domain arrangement 10 including a magnetoresistance detector in accordance with this invention. The arrangement comprises a layer 11 of material in which single wall domains can be moved. In practice, domains in layer 11 are maintained at a nominal diameter by a bias field of a polarity to contract domains supplied by a bias field source represented by block 13 in FIG. 1.

The movement of domains in layer 11 is accomplished by a periodic, magnetically soft, overlay pattern of elements 15 due to magnetic pole patterns generated in the elements in response to magnetic field reorienting in the plane of layer 11. The elements shown in FIG. 1 are V-shaped and closely spaced laterally with respect to one another to form a chevron pattern for each of a sequence of stages. The chevron pattern repeats from left to right as viewed in the figure, a greater number of elements being present in consecutive stages from an input stage at 16 to an output or detection stage at 17. The number of elements in the consecutive stages to the right of output stage 17 diminishes similarly.

The term "closely spaced" when characterizing the distance between adjacent elements in a stage of a field access arrangement of the type shown in FIG. 1 indicates that the elements are spaced so that the poles generated on more than one element attract a domain at the same time. Typically, such a spacing is about equal to a domain diameter. Patterns of this type define domain propagation channels in which domains of different lengths can be moved without, necessarily, an accompanying change in the bias field. Propagation of domains in the channels is in response to a clockwise rotating in-plane field supplied by a source represented by block 18 in FIG. 1.

The increasing number of laterally displaced elements in consecutive stages of FIG. 1 are operative in the presence of a specified bias field and in-plane field to increase the vertical dimension of a domain moving from stage to stage as viewed in FIG. 1. For example, a 6 micron domain introduced at input 16 increases to about 240 microns by increasing the number of elements from three at input 16 to 40 at the output stage 17.

Figure 2:
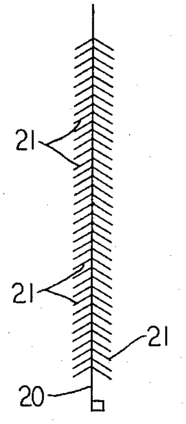

An illustrative magnetoresistance element is shown at 20 in stage 17 of FIG. 1 and in FIG. 2. The element can be seen to extend vertically through the apices of all the elements 21 in that stage. The thickness of the magnetoresistance element is equal to that of an element 21 and accordingly is produced by the same photoresist process which forms those elements. Also in accordance with this invention, element 20 has a width illustratively equal to that of an element 21. The width of element 20 is chosen such that the element saturates magnetically when the in-plane field is aligned therewith. This ensures that the magnetic poles required at the apices of the elements during a portion of the propagation cycle will actually be present. This would not be the case if element 20 is relatively wide (viz: five times the chevron element width).

Figure 3:
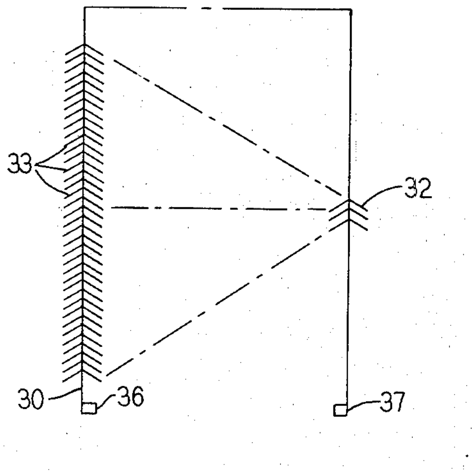

Element 20 is connected illustratively between a utilization circuit represented by block 22 in FIG. 1 and ground. It is convenient that a return current path for element 20 be provided along a path 23 in FIG. 1. The return path may be defined by an electrical conductor or, more conveniently, by magnetically soft permalloy during the photoresist process which produces elements 15, 20, and 21 of FIGS. 1 and 2. FIG. 3 shows the geometry for such a hairpin shaped permalloy magnetoresistance element which interconnects chevron patterns 32 and 33 of two stages of a channel into "fishbone" shapes.

If a conductor-permalloy path is employed for detection, the organization of the return path through the symmetrical portion of the chevron pattern of the stage adjacent to 17 has an advantageous effect consistent with normal domain propagation by a fine-grained pattern of elements. To be specific, element 20 is pulsed periodically (once each propagation cycle to interrogate or strobe the output signal) under the control of control circuit 35 of FIG. 1 by means of conductors connected to lands 36 and 37 of FIG. 3. The current so generated in the loop defined by the hairpin path generates a field (interrogation) to expand a domain encompassed by the hairpin and thus improves detection by aiding domain elongation. The use of a pulsed interrogation field will not impair normal propagation.

If the return path for common element 20 is also permalloy, then that path is through the symmetrical portion of a stage with fewer propagation elements, typically one-tenth the number in the stage coupled by element 20. This arrangement is to avoid combining signals from two stages.

The hairpin geometry is particularly convenient if the pattern of channel-defining elements is formed in a closed-loop geometry along broken line 40 of FIG. 1. Actually, each stage of the return portion of a closed loop path corresponding to line 40 would comprise two or three V-shaped elements.

In the absence of a closed loop path, domains are provided selectively at 16 in accordance with U.S. Pat. No. 3,611,331 of P. I. Bonyhard, issued Nov. 5, 1971 in response to an input pulse provided by a source represented in FIG. 1 by block 42.

Sources 13, 18, and 42 and circuit 22 are connected to control circuit 35 for synchronization and activation. The various sources and circuits may be any such element capable of operating in accordance with this invention.

An elongated magnetoresistance element in accordance with this invention is clearly compatible with the element geometry for normal operation of a fine-grained single wall domain propagation arrangement. The following example will now show the advantages in terms of enhanced output signal obtained as a result of such an arrangement: Assume a permissible current density of $10^6$ amps/cm$^2$. The maximum detector signal is given by $$(1)\ V_{signal} = i\rho \cdot (\Delta\rho/\rho)\, l.$$

where $i$ = allowable current density $\rho$ = permalloy resistivity $\Delta\rho$ = change in resistivity due to magnetoresistance and $l$ = detector length (active).

Using the parameters for permalloy, $V_{signal}$ = 0.06 millivolts/micron · $l$ (microns). Experimental results show that the signal due to a domain is 1/5 to 1/7 of the voltage produced by the in-plane field. The final expression accordingly becomes $$(3)\ V_{signal} \approx 0.01 \text{ millivolts/micron} \cdot l \text{ (microns)}.$$

In other words, to produce a 1 millivolt signal, the detector is 100 microns in length. On a permalloy pattern having a thickness of 0.3 microns and a stage-to-stage period of 20 microns for moving domains having nominal diameters of about 6 microns, adjacent elements in a stage are on about 6-micron centers and are 2 microns wide. A stack of 40 elements at the detector stage provides an output signal of 1.0 millivolt for a 6-micron domain moved for example in an epitaxially grown film of $YGdLaY_b$ garnet, 6 microns thick. The detector is strobed with pulses of 6.5 milliamperes of 2 microsecond duration. The in-plane field is 20 oersteds. Propagation operation in excess of 100 kilocycles have been achieved in such arrangements. A bias field typically of 80 oersteds is employed.

For comparison, a magnetoresistance detector having a geometry to correspond to domains of 6 microns produces signals of 60 microvolts in a like environment.

What has been described is considered only illustrative of the principles of this invention. Therefore, various modifications can be devised by those skilled in the art in accordance with those principles within the spirit and scope of this invention. For example, the magnetoresistance element need not correspond to the apices of the propagation pattern. The position of the element depends upon the designed orientation of the in-plane field when an output signal occurs (viz: when the interrogation pulse is applied). In the illustrative arrangement, the output signal occurs when the in-plane field is directed upward as indicated by arrow H in FIG. 1 at a time when a domain is moved to the apices of the chevron pattern. If an output signal is desired at a time when the in-plane field is directed to the right as viewed in FIG. 1, the magnetoresistance element would correspond to the right edges of the elements of the chevron rather than in the position shown in FIG. 1. Moreover, the intersection of a common (magnetoresistance) element and each chevron element in an output stage is advantageously square to maximize the output signal as is consistent with prior art thinking.

What is claimed is:

1. A magnetic arrangement comprising a layer of material in which single wall domains can be moved, a fine-grained pattern of elements for defining in said layer a multiple stage path including an output stage for moving domains therealong in response to a magnetic field reorienting in the plane of said layer, consecutive ones of said stages including consecutively increasing numbers of elements.

2. A magnetic arrangement in accordance with claim 1 wherein said pattern includes increasing numbers of elements reaching a maximum number at said output stage, said number decreasing in stages following said output stage.

3. A magnetic arrangement in accordance with claim 1 wherein said output stage comprises magnetically soft like elements laterally displaced with respect to one another and having a first width and thickness, and a common magnetically soft element interconnecting said like elements also having said first width and thickness.

4. A magnetic arrangement in accordance with claim 3 wherein a stage following said output stage also comprises magnetically soft like elements having said first width and thickness and includes a second common element, and means for electrically connecting said first and second common elements.

5. A magnetic arrangement in accordance with claim 3 wherein said like magnetically soft elements comprise V-shaped elements having apices and said common element connects said elements at said apices.

6. A magnetic arrangement in accordance with claim 4 wherein said like elements in each of said output and following stages comprise V-shaped elements having apices and said first and second common elements interconnect the apices of the elements in said output and following stage respectively.

7. A magnetic arrangement in accordance with claim 2 wherein said elements comprise magnetically soft like elements laterally displaced from one another and having a first width and thickness, and a magnetically soft common element interconnecting said elements of said output stage, said common element having a cross-sectional area to saturate magnetically when said in-plane field is aligned therewith.

8. A magnetic arrangement in accordance with claim 6 wherein said second common element also comprises magnetically soft material.

9. A magnetic arrangement in accordance with claim 8 also including means for impressing a current in said first and second common elements at a time when said in-plane field is aligned therewith, and means for providing said in-plane field.

10. A magnetic arrangement in accordance with claim 4 wherein said second common element comprises an electrically conducting material and said stage following said output stage comprises the stage next adjacent said output stage.

11. A magnetic arrangement in accordance with claim 4 wherein said second common element comprises magnetically soft material and said stage following said output stage comprises relatively few of said like elements.

12. A magnetic arrangement in accordance with claim 10 wherein said path comprises a closed loop.

13. A magnetic arrangement in accordance with claim 11 wherein said path comprises a closed loop.

* * * * *